United States Patent [19]

Zeitler

[11] Patent Number: 4,516,883
[45] Date of Patent: May 14, 1985

[54] MINE ROOF BOLT MOUNTING ASSEMBLY

[75] Inventor: Louie Zeitler, Brecksville, Ohio

[73] Assignee: Die-Matic Corporation, Brooklyn Heights, Ohio

[21] Appl. No.: 481,400

[22] Filed: Apr. 1, 1983

[51] Int. Cl.³ .............................................. E21D 20/02
[52] U.S. Cl. .................................. 405/260; 405/259; 411/57
[58] Field of Search .............. 405/259, 260, 261, 262; 411/47, 57, 63, 64

[56] References Cited

U.S. PATENT DOCUMENTS

| | | | |
|---|---|---|---|
| 3,877,235 | 4/1975 | Hill | 405/261 |
| 3,896,627 | 7/1975 | Brown | 405/261 |
| 4,023,373 | 5/1977 | Hipkins | 405/261 |
| 4,051,683 | 10/1977 | Koval | 405/261 |
| 4,100,748 | 7/1978 | Hansen | 405/259 |
| 4,132,080 | 1/1979 | Hansen | 405/261 |
| 4,162,133 | 7/1979 | Clark et al. | 405/258 |
| 4,187,040 | 2/1980 | Donan, Jr. | 405/259 |
| 4,299,515 | 11/1981 | Yates et al. | 405/259 |
| 4,334,805 | 6/1982 | Morgan | 405/261 |

Primary Examiner—David H. Corbin
Attorney, Agent, or Firm—Yount & Tarolli

[57] ABSTRACT

A mounting assembly for holding a bolt in a hole or opening drilled in a mine roof includes an expansion anchor assembly which mechanically grips the side surface of the hole and an adhesive anchor section which is bonded to the side surface of the hole by a body of adhesive material. When the mounting assembly is to be installed in a hole drilled in a mine roof, a cartridge of adhesive is inserted into the hole and the mounting assembly is forced upwardly in the hole until the cartridge ruptures. Immediately after the cartridge ruptures, a bolt is tightened to press retainer elements in the expansion anchor assembly against the side surface of the hole. Shortly thereafter, the adhesive sets up around the expansion anchor assembly and the tubular adhesive anchor section. Therefore, the expansion anchor assembly provides a mechanical gripping action with the stratum of rock in which the hole is drilled and adhesive bond is obtained between the tubular adhesive anchor section and the stratum of rock.

4 Claims, 3 Drawing Figures

MINE ROOF BOLT MOUNTING ASSEMBLY

BACKGROUND OF THE INVENTION

The present invention relates to a new and improved mounting assembly to hold a bolt in a selected position. The mounting assembly may be advantageously used to hold bolts in a mine roof.

Expansion assemblies have previously been used to anchor mine roof bolts. One known expansion anchor assembly is disclosed in U.S. Pat. No. 4,100,748. This known expansion anchor assembly has a pair of retainer elements or leaves which are forced outwardly by a cone nut to provide a mechanical gripping action with a stratum of rock in which a mine roof bolt is to be anchored.

In an effort to anchor mine roof bolts in a relatively unstable stratum, it has been suggested that an adhesive anchor could be used in the manner disclosed in U.S. Pat. No. 3,877,235. The adhesive anchor disclosed in this patent bonds a tubular cylindrical section to a side surface of a hole drilled in a mine roof. When the anchor is to be installed, a cartridge containing adhesive is inserted into the hole ahead of the tubular section. The tubular section is then forced upwardly into the hole to rupture the cartridge. The tubular section is then rotated to mix the adhesive. As the adhesive is mixed, a bonding action is obtained between the tubular and the side surface of the hole.

SUMMARY OF THE PRESENT INVENTION

The present invention provides a mounting assembly for holding a bolt in a selected position in a hole. Although the mounting assembly is advantageously used to anchor mine roof bolts, it is contemplated that the mounting assembly could be used for other purposes if desired. The mounting assembly includes an expansion anchor assembly which mechanically grips the side surface of the hole and a tubular adhesive anchor member which is bonded to the side surface of the hole. This results in the obtaining of independent mechanical and adhesive gripping actions between the mounting assembly and the side surface of the hole.

During installation of the mounting assembly, the tubular adhesive anchor member is not moved after it has been engaged by the adhesive material. This promotes the formation of a secure bond between the adhesive material, the side of a hole in the mine roof, and the tubular member.

Accordingly, it is an object of this invention to provide a new and improved assembly to hold a bolt in a selected position in a hole and wherein the mounting assembly includes an expansion anchor assembly which grips a side surface of the hole and an adhesive anchor section which is bonded to the side surface of the hole.

Another object of this invention is to provide a mounting assembly as set forth in the next preceeding object and wherein the adhesive anchor section is stationary after it has been engaged by adhesive material.

BRIEF DESCRIPTION OF THE DRAWINGS

The foregoing and other features of the present invention will become more apparent to those skilled in the art upon a reading of the following specification taken in conjunction with the accompanying drawings wherein.

DESCRIPTION OF ONE SPECIFIC PREFERRED EMBODIMENT OF THE INVENTION

Figure 1:
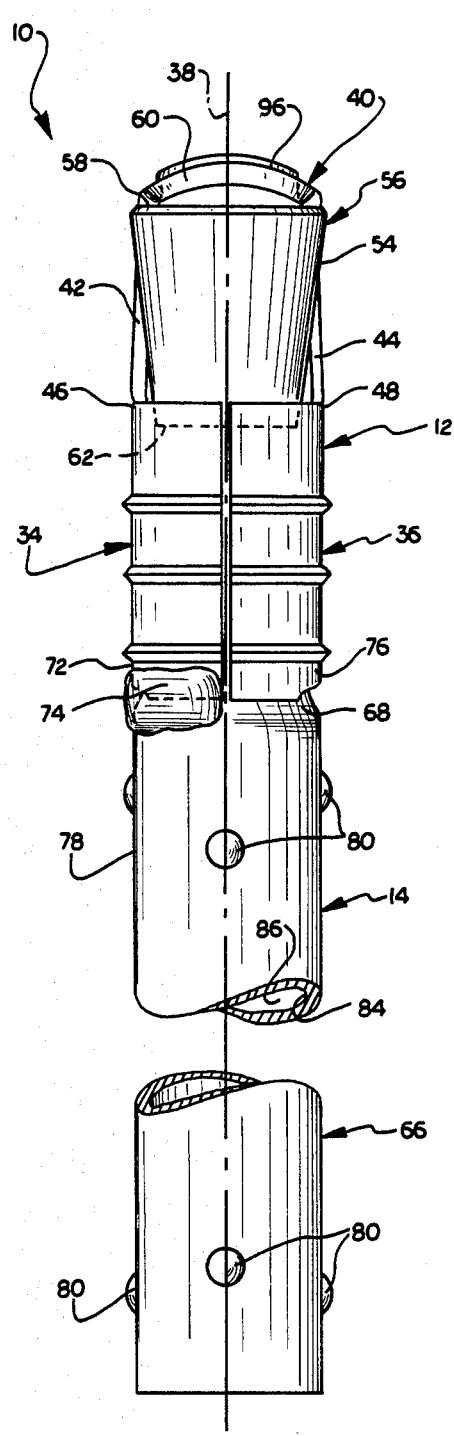
FIG. 1 is an illustration of a mounting assembly constructed in accordance with the present invention.

A mounting assembly 10 constructed in accordance with the present invention includes an expansion anchor assembly 12 and an adhesive anchor section 14. The expansion anchor assembly 12 expands outwardly from the retracted condition of FIG. 1 to the expanded condition of FIGS. 2 and 3 to provide a solid mechanical grip with a cylindrical side surface 16 of a hole 18 formed in a stratum 20 at the roof of a mine. The adhesive anchor section 14 is bonded to the side surface 16 of the hole 18 by a body 24 (FIGS. 2 and 3) of adhesive material. Thus, the mounting assembly 10 holds a mine roof bolt 30 in position with two independent anchors, that is, a mechanical anchor provided by the expansion anchor assembly 12 and the adhesive anchor provided by the bond between the side surface 16 of the hole and the adhesive anchor section 14.

The expansion anchor assembly 12 includes a pair of retainer elements or leaves 34 and 36 (FIG. 1). The leaves 34 and 36 have a generally semi-cylindrical configuration and are disposed with their longitudinal central axes coincident with the central axis 38 of the mounting assembly 10 prior to installation of the mounting asembly. A generally U-shaped bail 40 has downwardly projecting legs 42 and 44 which are fixedly connected with upper end portions 46 and 48 of the retainer leaves 34 and 36.

The legs 42 and 44 of the bail 40 are received in a pair of slots 52 and 54 (see FIG. 3) formed in a conical expander nut 56. The expander nut 56 tapers downwardly from a relatively large circular end 58 (FIG. 1) disposed adjacent to a bight portion 60 of the bail 40 to a relatively small diameter inner or lower end surface 62. The lower end portion of the nut 56 is disposed between the upper end portions of the leaves 34 and 36 (FIG. 1). The expander nut 56 has a threaded central opening which is engaged by the mine roof bolt 30. The expansion anchor assembly 12 is of the same construction as the expansion anchor assembly disclosed in U.S. Pat. No. 4,100,748.

Figure 3:
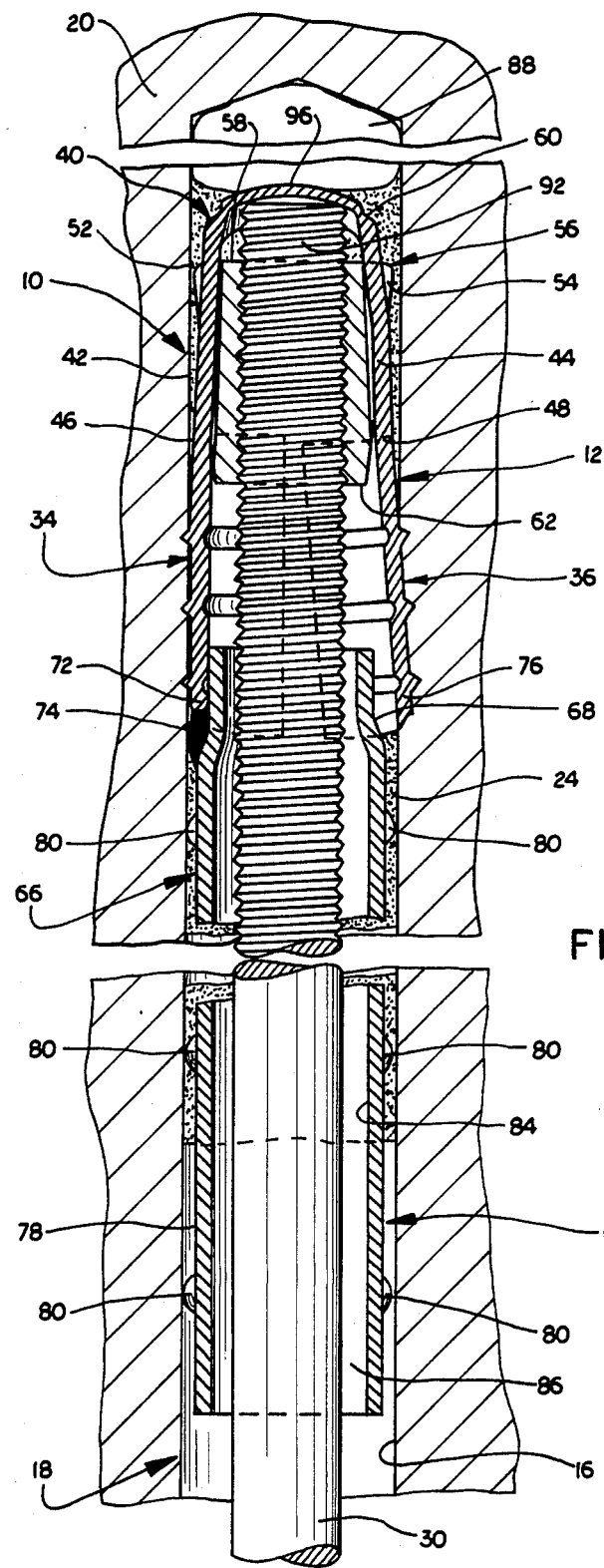
FIG. 3 is a sectional view of the mounting assembly in the hole in the mine roof.

The adhesive anchor section 14 engages the body 24 of adhesive material to provide an anchor with the side surface 16 of the hole 18 independently of the expansion anchor assembly 12. The adhesive anchor section 14 includes a cylindrical tubular member 66 (FIG. 1) having a tapered axially outer or upper end portion 68 which is received in the expansion anchor assembly 12 (FIG. 3). A lower end portion 72 of the retainer leaf 34 is fixedly connected to the tubular member 66 by a weld 74. A lower end portion 76 of the other retainer leaf 36 is movable relative to the tubular member 66.

The tubular member 66 has a cylindrical outer side surface 78 in which a plurality of projections 80 are formed. The projections 80 cooperate with the body 24 of adhesive material (FIGS. 2 and 3) to hold the tubular member 66 against rotational movement relative to the adhesive material. The tubular member 66 has a cylindrical inner side surface 84 (FIG. 3) which defines a passage 86 extending through the tubular member to the expansion anchor assembly 12. The passage 86 enables the mine roof bolt 30 to extend upwardly through the adhesive anchor section 14 into threaded engagement with the nut 56. Since the adhesive material does not enter the tubular member 66, only the upper end portion of the mine roof bolt 30 is exposed to the adhesive material.

Figure 2:
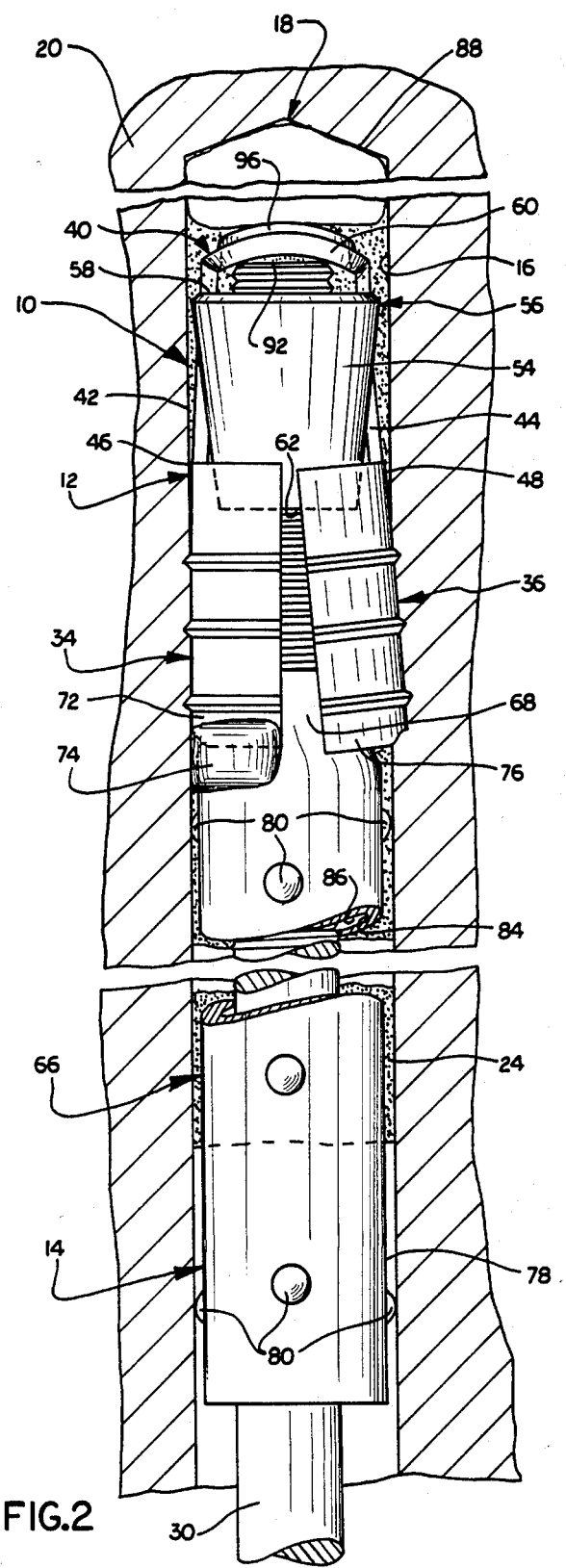
FIG. 2 is a fragmentary illustration of the mounting assembly of FIG. 1 and a hole in a mine roof.

Prior to installation of the mounting assembly 10 in the hole 18 in the mine roof, the leaves 34 and 36 of the expansion anchor assembly 12 are disposed in a generally cylindrical array which has the same diameter as and forms a continuation of the tubular member 66. This results in the mounting assembly 10 having a generally cylindrical overall configuration so that it can be readily inserted into the cylindrical hole 18 with a minimum of interference between the mounting assembly and the side surface 16 of the hole. The outer side surface 78 of the cylindrical tubular member 66 has a diameter which is only slightly smaller than the inside diameter of the hole 18 (FIG. 2). This results in the tubular member 66 having a relatively larger surface area for bonding engagement with the body 24 of adhesive.

When the mounting assembly 10 is to be installed in a mine roof, the cylindrical hole 18 is drilled into the mine roof. A mine roof bolt 30 is screwed into the mounting assembly 10. A cartridge 88 of adhesive material is then inserted into the hole 18. The mounting assembly 10 is forced upwardly into the hole 18 behind the cartridge 88. The cartridge 88 is constructed so that when it is compressed between an end surface of the hole 18 and the mounting assembly 10, the cartridge is ruptured and a body of resin material and a curing or hardening catalyst are intermixed and then forced out of the catridge.

The fully mixed adhesive material flows from the cartridge 88 axially downwardly along the mounting assembly 10 to a location adjacent to the lower end of the stationary tubular member 66. Since the tubular member 66 has an outside diameter which is only slightly less than the diameter of the hole 18, a relatively small volume of adhesive is required to fill the space between the outside of the tubular member and the cylindrical side surface 16 of the hole.

Although other adhesive cartridges may be used, it is preferred to use an adhesive cartridge manufactured by 3M Corporation sold as the "No Mix" resin cartridge. The cartridge is available from 3M Corporation, Technology Enterprises Division, Building 219-13M Center, St. Paul, Minnesota 55144. The adhesive material is mixed prior to being discharged from the cartridge 88 and does not require exposure to a rotating member to mix the adhesive.

After the adhesive material 24 has flowed axially downwardly along both the expansion anchor assembly 12 and the stationary adhesive anchor section 14, the mine roof bolt 30 is tightened. Since the mine roof bolt 30 is enclosed by the stationary tubular member 66 and expansion anchor assembly 12, the mine roof bolt can be rotated after the cartridge 88 has been ruptured without disturbing the bond being formed between the tubular member 66 and the side surface 16 of the hole 18. Tightening the mine roof bolt 30 results in engagement of a threaded upper end portion 92 of the mine roof bolt 30 with the bight portion 60 of the bail 40 (see FIG. 3). As the mine roof bolt 30 continues to be tightened, the conical nut 56 is forced axially downwardly against the upper end portions 46 and 48 of the retainer leaves 34 and 36.

As the nut 56 is forced downardly by the bolt 30, the tapered outer side surface 54 of the nut 56 forces the retainer leaf 36 diametrically outwardly away from the retainer leaf 34 into secure gripping engagement with the side 16 of the hole 18 (see FIGS. 2 and 3). The force exert by the retainer element 36 against a side area of the hole 18 forces the opposite retainer element 34 against the opposite side area of the hole. This results in the expansion anchor assembly 12 firmly gripping both sides of the hole 18 even though one of the retainer leaves, that is the retainer leaf 34, is fixedly connected to the tubular member 66.

After the conical nut 56 has urged retainer leaves 34 and 36 against the side surface 16 of the hole 18 with a preselected force, a weakened section 96 in the bight portion 60 of the U-shaped bail 40 is broken loose to provide an opening through which the mine roof bolt can pass. This enables the mine roof bolt 30 to be tightened after the expansion anchor assembly 12 has been firmly set against the side surface 16 of the hole 18. The manner in which the mine roof bolt 30 breaks through the weakened section 96 of the bail 40 is the same as is described in U.S. Pat. No. 4,100,748.

After the mine roof bolt 30 has been tightened and the expansion anchor assembly 12 has firmly gripped the side surface 16 of the hole 18, the body of adhesive material 24 sets or cures. Since the tubular member 66 remained stationary after the adhesive had been discharged from the cartridge 88, a firm bond forms between the body 24 of adhesive material and both the side surface 16 of the hole 18 and the side surface 78 of the tubular member 66. In addition, the setting of the adhesive material holds the retainer leaves 34 and 36 and rock material forming the stratum 20 against movement relative to each other so than the expansion anchor assembly 12 maintains a tight mechanical gripping action with the stratum 20.

In view of the foregoing description it is apparent that the present invention provides a mounting assembly 10 for holding a bolt 30 in a selected position in a hole 18. Although the mounting assembly 10 is advantageously used to anchor mine roof bolts, it is contemplated that the mounting assembly could be used for other purposes if desired. The mounting assembly 10 includes an expansion anchor assembly 12 which mechanically grips the side surface 16 of the hole 18 and an adhesive anchor section 14 which is bonded to the side surface of the hole independently of the expansion anchor assembly 12. This results in the obtaining of both a mechanical and an adhesive gripping actions between the mounting assembly 10 and the side surface 16 of the hole 18.

During installation of the mounting assembly 10, the tubular adhesive anchor member 66 is not moved after it has been engaged by the body 24 of adhesive material. This promotes the formation of a secure bond between the adhesive material 24, the side surface 16 of the hole 18, and the tubular member 66.

Having described one specific preferred embodiment of my invention, the following is claimed:

1. An assembly adapted to be received in an elongated opening in a body and to cooperate with the body to hold a bolt in a selected position relative to the body, said assembly comprising expandable anchor means for gripping a side surface of the opening, said expandable anchor means including retainer means for engaging the side surface of the opening and expander means for engaging an end portion of the bolt and forcing at least a portion of said retainer means outwardly away from a central axis of said expandable anchor means against the side surface of the opening to hold said assembly against movement relative to the opening, and tubular means connected with and extending axially from said expandable anchor means for engaging a body of adhesive material disposed between an outer side surface of said tubular means and the side surface of the opening at a location below said expandable anchor means to further hold said assembly against movement relative to the opening, said tubular means includes a rigid metal tube having a generally cylindrical configuration, said retainer means including a pair of rigid metal leaves each of which has a generally semi-cylindrical shape, an axially inner end portion of a first one of said leaves being fixedly connected to an end portion of said rigid metal tube, a generally U-shaped bail strap connected with axially outer end portions of said leaves, said bail strap having a pair of leg portions interconnected by a bight portion, an axially inner end portion of a second one of said leaves being disposed adjacent to the side surface of said rigid metal tube at a location diametrically opposite from the inner end portion of said first one of said leaves, said inner end portion of said second one of said leaves being movable diametrically outwardly away from an outer side surface of said rigid metal tube, said expander means including a nut disposed between said leg portions of said bail strap, said nut having a frustoconical outer side surface which tapers inwardly from a relatively large outer end portion of said nut disposed adjacent to said bight portion of said bail strap to a relatively small inner end portion disposed adjacent to the axially outer end portions of said leaves, said nut having internal thread means for engaging a threaded end portion of said bolt, said nut being movable axially inwardly toward said inner end portions of said leaves under the influence of force applied against said nut by the bolt to force the inner end portion of said second one of said leaves to move diametrically outwardly away from said first one of said leaves against the side surface of the opening.

2. An anchor assembly adapted to be received in an opening in a mine roof and to cooperate with the material of the mine roof to hold a bolt in a selected position relative to the mine roof, said anchor assembly comprising adhesive anchor means for providing an adhesive anchor between said anchor assembly and the side surface of the opening, said adhesive anchor means including (1) a rigid tubular member formed of metal and (2) adhesive means disposed between the outer side surface of said rigid tubular member and the side of the opening in the mine roof for anchoring said rigid tubular member against movement relative to the side surface of the opening in the mine roof, mechanical anchor means for providing a mechanical gripping action between said assembly and the material of the mine roof, said mechanical anchor means including (1) a plurality of rigid metal anchoring elements, (2) means for fixedly connecting one of said anchoring elements to said rigid tubular member to prevent relative movement between said one anchoring element and said rigid tubular member and to maintain a constant spatial relationship between said one anchoring element and said rigid tubular member, and (3) means for supporting another of said anchoring elements for movement relative to said rigid tubular member and said one anchoring element, and actuator means for moving said other anchoring element relative to said rigid tubular member and said one anchoring element to cause said other anchoring element to pierce through the side surface of the opening into the material of the mine roof, said actuator means being ineffective to move said one anchoring element relative to said rigid tubular member during movement of said other anchoring element.

3. An anchor assembly as set forth in claim 2 wherein said other anchoring element has an inner end portion which is disposed adjacent to said rigid tubular member and an outer end portion which is spaced further from said rigid tubular member than the inner end portion of said other anchoring element, said actuator means being operable to move said other anchoring element to pierce the side surface of the opening with the inner end portion of said other anchoring element.

4. An anchor assembly as set forth in claim 3 wherein said one anchoring element has an inner end portion fixedly connected to the outer end portion of said rigid tubular member and an outer end portion which is spaced from said rigid tubular member, said actuator means being operable to move the inner end portion of said other anchoring element away from the inner end portion of said one anchoring element to pierce the side surface of the opening.

* * * * *